Feb. 17, 1959

W. G. HALL ET AL 2,874,373

LOGIC CIRCUITS

Filed Dec. 15, 1955

United States Patent Office 2,874,373

Patented Feb. 17, 1959

2,874,373

LOGIC CIRCUITS

William G. Hall, Ridgewood, N. J., and Robert I. Van Nice, Shaler Township, Allegheny County, and William G. Evans, Monroeville, Pa., assignors to Westinghouse Electric Corporation, East Pittsburgh, Pa., a corporation of Pennsylvania

Application December 15, 1955, Serial No. 553,285

5 Claims. (Cl. 340—174)

This invention relates to flip-flops or memory devices and more particularly to flip-flops of the magnetic type.

Heretofore several types of flip-flops have been developed. In one such flip-flop of the magnetic type, the output from each side of the flip-flop is fed back to its respective input so as to oppose a constant reset voltage. However, this prior art magnetic type flip-flop has several disadvantages. For instance, owing to the characteristics of the magnetic cores and rectifiers, the feed-back signal of this prior art flip-flop may not be greater in magnitude than the constant reset voltage during the entire 180° reset period. Such being the case, a certain amount of reset of the magnetic core members takes place. Thus, the output from the flip-flop circuit will be less than the full output value.

As the operating time of the above mentioned prior art flip-flop increases, the number of degrees over which the feed-back signal is greater in magnitude than the reset voltage may even become less due to changes in the line voltage or due to changes in the characteristics of the magnetic cores and rectifiers which result from aging and temperature changes. In fact, in time the condition may advance to such a state that the feed-back signal no longer is able to prevent a complete reset of the magnetic core member and thus the flip-flop will assume a new state of operation. Therefore, the above-described prior art magnetic type flip-flop is not stable.

An object of this invention is to provide a new and improved magnetic type flip-flop or memory circuit.

Another object of this invention is to provide a stable magnetic type flip-flop or memory circuit irrespective of changes in line voltage or changes in the characteristics of the magnetic core members or rectifiers, by utilizing the feed-back current received from the output of each side of the memory circuit to directly reset the magnetic core member on the other side of the memory circuit.

Other objects of this invention will become apparent from the following description when taken in conjunction with the accompanying drawing, in which.

Figure 1:
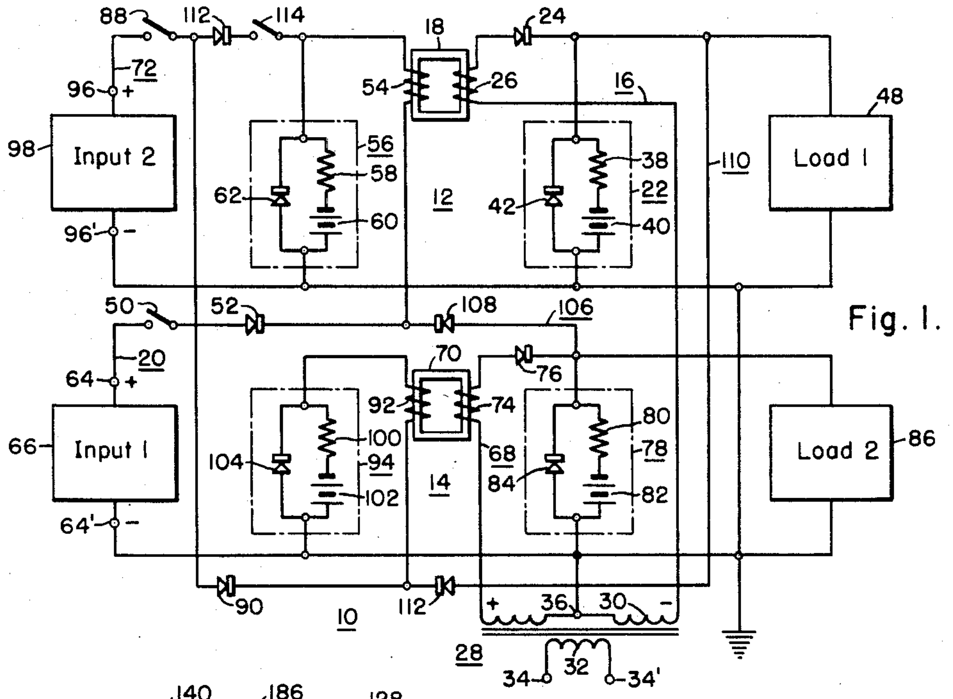
Figure 1 is a schematic diagram of apparatus and circuits illustrating an embodiment of this invention.

Referring to Fig. 1 there is shown a magnetic type flip-flop or memory circuit 10 illustrating this invention. In general, the flip-flop 10 comprises two Not circuits 12 and 14 which are so interconnected and controlled as to effect the above-mentioned objects.

The Not circuit 12 comprises a gating circuit 16 for driving a magnetic core member 18 to positive saturation, and a control circuit 20 for effecting a reset of the magnetic core member 18 to negative saturation to thus change the operating state of the flip-flop 10 as will be explained hereinafter. The magnetic core member 18 is preferably constructed of rectangular loop core material.

In this instance, the gating circuit 16 comprises a non-linear device 22, a self-saturating rectifier 24, and a reset or load winding 26 which is disposed in inductive relationship with the magnetic core member 18. Energy for the gating circuit 16 is received from a power supply, specifically a potential transformer 28 having a center tapped secondary winding 30, and a primary winding 32 which is connected to terminals 34 and 34' which have applied thereto a suitable alternating voltage. The secondary winding 30 is provided with a center tap 36.

The self-saturating rectifier 24 is connected in series circuit relationship with the gating winding 26 in order to permit current to flow in only one direction through the gating winding 26. In order to permit substantially all of the voltage across the right hand side of the secondary winding 30 of the transformer 28 to appear across the gating winding 26 when the magnetic core member 18 is being driven to positive saturation, the non-linear device 22 is connected in series circuit relationship with the series connected gating winding 26 and self-saturating rectifier 24. As illustrated, the series circuit including the gating winding 26, the self-saturating rectifier 24 and the non-linear device 22 is connected between the center tap 36 and the right end of the secondary winding 30, as shown.

Figures 2, 3:
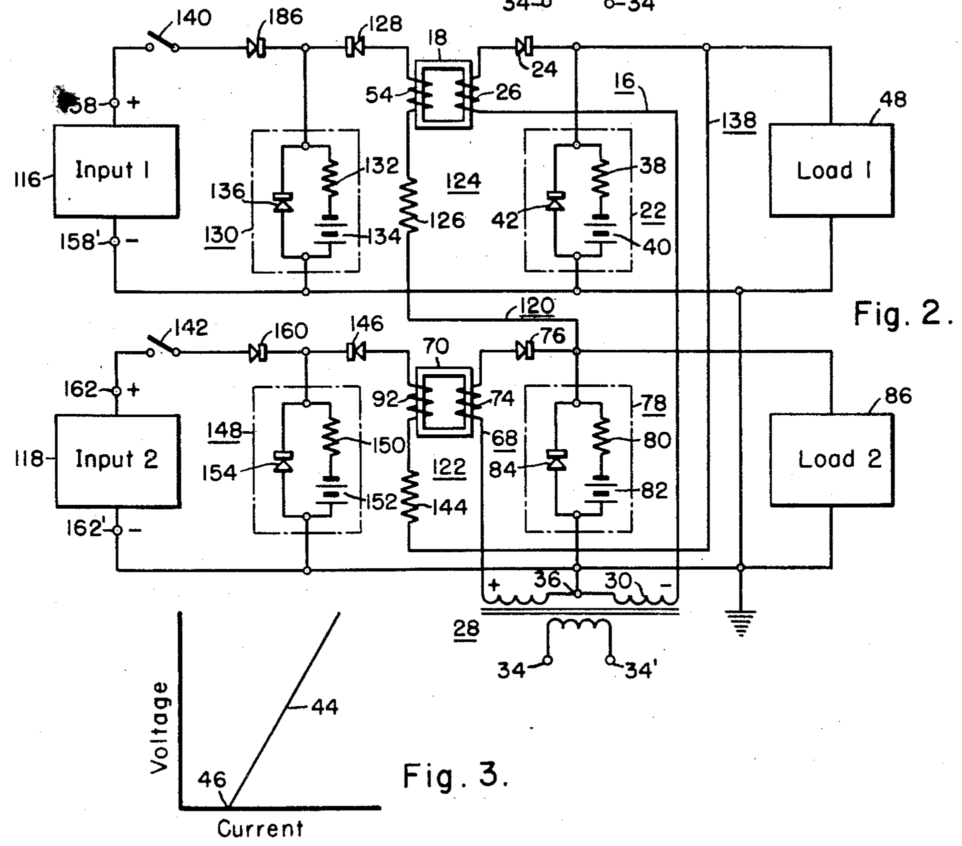
Fig. 2 is a schematic diagram of apparatus and circuits illustrating another embodiment of this invention.
Fig. 3 is a graph illustrating the voltage-current characteristic of the non-linear devices shown in Figs. 1 and 2.

In this instance, the non-linear device 22 comprises a parallel circuit, one branch of which includes a resistor 38 and a direct-current source, specifically a battery 40, and the other branch of which includes a unilateral conducting device, specifically a rectifier 42. The reason that the non-linear device 22 offers a high impedance when the magnetic core member 18 is at positive saturation and yet has substantially no voltage drop thereacross when magnetizing current is flowing through the gating winding 26 is illustrated by the graph shown in Fig. 3. In Fig. 3 a curve 44 represents the voltage-current characteristic of the non-linear device 22. As can be seen from the curve 44, as long as the current flow through the non-linear device 22 is of smaller magnitude than as represented at a point 46, such as is the case when magnetizing current flows therethrough, the voltage drop thereacross is substantially of zero magnitude. However, if the current flow through the non-linear device 22 increases to a value above that value represented at the point 46, such as is the case when load current flows through the gating winding 26, then the voltage drop thereacross increases substantially with an increase in the magnitude of the current flow therethrough. As illustrated, a load 48 is connected across the non-linear device 22.

As thereinbefore mentioned, the control circuit 20 is disposed to effect a reset of the magnetic core member 18 to negative saturation. The control circuit 20 comprises a switch 50, a blocking rectifier 52, the function of which will be described hereinafter, a reset winding 54 disposed in inductive relationship with the magnetic core member 18, and a non-linear device 56. The reset winding 54 is so disposed on the magnetic core member 18 and so interconnected with the remainder of the circuit that current flow therethrough produces a magnetomotive force which opposes the megnetomotive force produced by the current flow through the gating winding 26.

As can be seen from the drawing, the non-linear device 56 is similar to the non-linear device 22 and also comprises a parallel circuit, one branch of which includes a resistor 58 and a direct-current source, specifically a battery 60, and the other branch of which includes a unidirectional conducting means, specifically a rectifier 62. In operation, the non-linear device 56 functions to offer a high impedance to the flow of current once the magnetic core member 18 has been reset to negative saturation. However, the characteristic of the non-linear device 56 is also such that when the magnetic core member 18 is being driven toward negative saturation there is substantially no voltage drop across the non-linear device 56. In other words, the non-linear device 56 has a voltage-current characteristic curve similar to the voltage-current characteristic curve of the non-linear device 22 as illustrated in Fig. 3. The non-linear device 56 also performs another function which will be described hereinafter.

As illustrated in the drawing, the switch 50, the blocking rectifier 52, the reset winding 54, and the non-linear device 56 are connected in series circuit relationship with one another, the series circuit being connected to input control terminals 64 and 64'. A control source 66 is connected to the control terminals 64 and 64'.

The Not circuit 14 is similar to the Not circuit 12 and comprises, in general, a gating circuit 68 for driving a magnetic core member 70 to positive saturation, and a control circuit 72 for resetting the magnetic core member 70 to negative saturation to thus change the operating state of the Flip-Flop 10 as will be explained hereinafter.

The gating circuit 68 comprises a gating or load winding 74 which is disposed in inductive relationship with the magnetic core member 70, a self-saturating rectifier 76, and a non-linear device 78. The self-saturating rectifier 76 is connected in series circuit relationship with the gating winding 74 in order to permit current to flow in only one direction through the gating winding 74. In order to have substantially all the voltage across the left side of the secondary winding 30 of the transformer 28 appear across the gating winding 74 while the magnetic core member 70 is being driven toward positive saturation, the non-linear device 78 is connected in series circuit relationship with the gating winding 74 and the self-saturating rectifier 76. As illustrated, the series circuit including the gating winding 74, the self-saturating rectifier 76 and the non-linear device 78 is connected across the left half of the secondary winding 30, as shown.

The non-linear device 78 is similar to the non-linear devices 22 and 56 and comprises a parallel circuit one branch of which includes a resistor 80 and a direct-current source, specifically a battery 82, and the other branch of which includes a unilateral conducting device, specifically a rectifier 84. The voltage-current characteristic for the non-linear device 78 is similar to the voltage-current characteristic of the non-linear device 22 as shown in Fig. 3. As illustrated, a load 86 is connected across the non-linear device 78.

As hereinbefore mentioned, the control circuit 72 effects a resetting of the magnetic core member 70 to negative saturation. In this instance, the control circuit 72 comprises a switch 88, a blocking rectifier 90, the function of which will be described hereinafter, a reset winding 92 disposed in inductive relationship with the magnetic core member 70, and a non-linear device 94. The reset winding 92 is so disposed on the magnetic core member 70 and so interconnected with the remainder of the circuit that current flow therethrough effects a magnetomotive force which opposes the magnetomotive force produced by the current flow through the gating winding 74.

As shown in the drawing, the switch 88, the blocking rectifier 90, the reset winding 92 and the non-linear device 94 are connected in series circuit relationship with one another, the series circuit being connected to input control terminals 96 and 96'. A control source 98 is connected to the control terminals 96 and 96'. In operation, the control sources 66 and 98 effect pulses of voltage between the control terminals 64 and 64' and the control terminals 96 and 96', respectively. These control pulses are so synchronized with respect to one another that when the polarity of the voltage across the secondary winding 30 of the transformer 28 is as shown in the drawing, a pulse of voltage appears between the control terminals 64 and 64' and no voltage appears between the control terminals 96 and 96'. However, when the polarity of the voltage across the secondary winding 30 is opposite to that shown in the drawing, then a voltage pulse appears between the control terminals 96 and 96' and no voltage appears between the control terminals 64 and 64'.

The non-linear device 94 is also similar to the non-linear devices 22, 56 and 78 and comprises a parallel circuit one branch of which includes a resistor 100 and a direct-current source, specifically a battery 102, and the other branch of which includes a unilateral conducting device, specifically a rectifier 104. In operation, the non-linear device 94 functions to limit the magnitude of the current flow through the reset winding 92 once the magnetic core member 70 has been reset to negative saturation. However, while the magnetic core member 70 is being reset to negative saturation, substantially no voltage appears across the non-linear device 94. Thus, the non-linear device 94 has a voltage-current characteristic similar to the voltage-current characteristic of the non-linear device 22, which voltage-current characteristic is illustrated by the curve 44 of Fig. 3. As will be explained hereinafter, the non-linear device 94 also performs a further function.

In order to effect a resetting of the magnetic core member 18 to negative saturation during that portion of the operation when the magnetic core member 70 is at positive saturation and an output voltage appears at the output of the Not circuit 14 and thus prevent an output voltage from appearing at the output of the Not circuit 12, a feed-back circuit 106 is connected between the gating winding 74 of the Not circuit 14 and the reset winding 54 of the Not circuit 12. The feed-back circuit 106 extends from the junction point of the self-saturating rectifier 76 and the non-linear device 78 through a blocking rectifier 108, the reset winding 54, and the non-linear device 56 to the junction point of the non-linear device 78 and the center tap 36 of the transformer 28. In operation, the blocking rectifier 108 prevents the flow of current from the control source 66 to the gating circuit 68 of the Not circuit 14. On the other hand, the blocking rectifier 52 prevents the flow of current from the feed-back circuit 106 to the control source 66.

In operation, the non-linear device 56 acts as a relatively large impedance once the feed-back circuit 106 has effected a resetting of the magnetic core member 18 to negative saturation. However, while the magnetic core member 18 is being reset to negative saturation by the action of the feed-back circuit 106, there is substantially no voltage drop across the non-linear device 56 and thus substantially all the feed-back voltage is available to effect a resetting of the magnetic core member 18 to negative saturation.

In order to effect a resetting of the magnetic core member 70 to negative saturation during that portion of the operation when the magnetic core member 18 is at positive saturation and an output voltage appears at the output of the Not circuit 12 and thus prevent an output voltage from appearing at the output of the Not circuit 14, a feed-back circuit 110 is interconnected between the gating winding 26 of the Not circuit 12 and the reset winding 92 of the Not circuit 14. The feed-back circuit 110 extends from the junction point of the self-saturating rectifier 24 and the non-linear device 22 through a blocking rectifier 112, the reset winding 92 of the Not circuit 14, and the non-linear device 94, to the lower end of the non-linear device 22, as shown. In operation, the blocking rectifier 112 functions to prevent the flow of current from the control source 98 to the gating circuit 16 of the Not circuit 12. On the other hand, the blocking rectifier 90 prevents the flow of current from the feed-back circuit 110 to the control source 98.

Once the feed-back circuit 110 has effected a resetting of the magnetic core member 70 to negative saturation, the non-linear device 94 functions to limit the flow of current through the reset winding 92. However, while the magnetic core member 70 is being driven to negative saturation by the action of the feed-back circuit 110, the voltage drop across the non-linear device 94 is extremely small and substantially all of the feed-back voltage is available to effect a resetting of the magnetic core member 70.

In order to prevent a resetting of the magnetic core member 18 to negative saturation when control voltages are applied between the control terminals 64 and 64' and 96 and 96' and when the switches 50 and 88 are in the circuit closed position and thus effect a load voltage across the load 48 and not across the load 86, a circuit, including a blocking rectifier 112 and a switch 114, is interconnected between the junction point of the switch 88 and the blocking rectifier 90 and the junction point of the reset winding 54 and the non-linear device 56. In operation, the blocking rectifier 112 functions to block the flow of current from the feed-back circuit 106 to the control source 98.

The operation of the Flip-Flop 10 will now be described. Assuming the switches 50, 88 and 114 are in the circuit open position as shown and assuming that both the magnetic core members 18 and 70 are at positive saturation, then if the voltage across the secondary winding 30 of the transformer 28 is as shown in the drawing, load current flows from the left side of the secondary winding 30, as shown, through the gating winding 74, the self-saturating rectifier 76, and the load 86, to the center tap 36 of the transformer 28. Thus, a load voltage appears across the load 86 during this half-cycle of operation. During the same half-cycle of operation, feed-back current also flows from the junction point of the self-saturating rectifier 76 and the non-linear device 78 through the blocking rectifier 108, the reset winding 54 of the Not circuit 12, and the non-linear device 56 to the center tap 36 of the transformer 28. The feed-back voltage effecting this current flow is of sufficient volt-seconds to effect a resetting of the magnetic core member 18 to negative saturation.

During the next half-cycle of operation, when the polarity of the voltage across the secondary winding 30 of the transformer 28 is opposite to that shown in the drawing, magnetizing current flows from the right end of the secondary winding 30, as shown, through the gating winding 26, the self-saturating rectifier 24 and the non-linear device 22 to the center tap 36 of the transformer 28. Magnetizing current flowing through the gating winding 26 drives the magnetic core member 18 to positive saturation, however, substantially no voltage appears across the load 48 since substantially all the voltage appearing between the center tap 36 and the right end of the secondary winding 40 is absorbed by the magnetic core member 18 in driving the magnetic core member 18 to positive saturation. During the next half-cycle of operation, when the polarity of the voltage across the secondary winding 30 is as shown in the drawing, the above-described cycle is repeated.

Still assuming the switches 50 and 88 are in the circuit open position and the magnetic core members 18 and 70 are at positive saturation, and further assuming that the voltage across the secondary winding 30 of the transformer 28 is of opposite polarity to that shown in the drawing, then load current will flow from the right end of the secondary winding 30, as shown, through the gating winding 26, the self-saturating rectifier 24 and the load 48, to the center tap 36 of the transformer 28. During this same half-cycle of operation, feed-back current flows from the junction point of the self-saturating rectifier 24 and the load 48 through the blocking rectifier 112, the reset winding 92, of the Not circuit 14, and the non-linear device 94 to the center tap 36. The voltage effecting this feed-back current is of sufficient volt-seconds as to effect a reset of the magnetic core member 70 to negative saturation.

During the next half-cycle of operation, when the voltage across the secondary winding 30 of the transformer 28 is as shown in the drawing, magnetizing current will flow from the left end of the secondary winding 30, as shown, through the gating winding 74, the self-saturating rectifier 76 and the non-linear device 78, to the center tap 36. Since substantially all of the voltage appearing across the left side of the secondary winding 30 is absorbed by the magnetic core member 70 in driving it to positive saturation, substantially no voltage appears across the load 86.

Assuming that the magnetic core member 18 of the Not circuit 12 is at positive saturation and that the magnetic core member 70 of the Not circuit 14 is at negative saturation so that a load voltage appears across the load 48 and substantially no voltage appears across the load 86, and assuming further that the switch 50 is in the circuit closed position and that the switches 88 and 114 are in the circuit open position and that the polarity of the voltage between the control terminals 64 and 64' and across the secondary winding 30 of the transformer 28 is as shown in the drawing, then current flows from the control terminal 64 through the switch 50, the blocking rectifier 52, the reset winding 54 of the Not circuit 12, and the non-linear device 56, to the control terminal 64'. This current flow through the reset winding 54 effects a resetting of the magnetic core member 18 to negative saturation. During the same half-cycle of operation, magnetizing current flows from the left end of the secondary winding 30, as shown, through the gating winding 74, the self-saturating rectifier 76, and the non-linear device 78, to the center tap 36 of the transformer 28. This latter action drives the magnetic core member 70 to positive saturation.

During the next half-cycle of operation when the polarity of the voltage across the secondary winding 30 is opposite to that shown in the drawing, magnetizing current will flow from the right end of the secondary winding 30 through the gating winding 26, the self-saturating rectifier 24, and the non-linear device 22, to the center tap 36 of the transformer 28. During this same half-cycle of operation, the self-saturating rectifier 76 prevents a driving of the magnetic core member 70 away from positive saturation. Further, since during this half-cycle of operation substantially all of the voltage is absorbed in driving the core member 18 to positive saturation, substantially no feed-back current flows to the reset winding 92 of the Not circuit 14 to effect reset of the magnetic core member 70.

During the next half-cycle of operation when the polarity of the voltage across the secondary winding 30 of the transformer 28 is as shown in the drawing, load current flows from the left end of the secondary winding 30 through the gating winding 74, the self-saturating rectifier 76 and the load 86, to the center tap 36 of the transformer 28. Thus, a load voltage now appears across the load 86. However, during this same half-cycle of operation, feed-back current flows through the reset winding 54 of the Not circuit 12 to effect a reset of the magnetic core member 18 to negative saturation. Therefore, during the next half-cycle of operation, substantially no voltage appears across the load 48 and the state of operation of the Flip-Flop 10 has been changed. Since a feed-back current now flows through the reset winding 54 of the Not circuit 12, the switch 50 could be actuated to the circuit open position and the Flip-Flop 10 would still remain in the same state of operation.

Assuming the switch 88 is in the circuit closed position and the switches 50 and 114 are in the circuit open position, and further assuming that the polarity of the voltage between the control terminals 96 and 96' is as shown in the drawing and the polarity of the voltage across the secondary winding 30 of the transformer 28 is opposite from that shown in the drawing and that the magnetic core member 70 is at positive saturation and the magnetic core member 18 is at negative saturation so that a load voltage appears across the load 86 and substantially no voltage appears across the load 48, then current flows from the terminal 96 through the switch 88, the blocking rectifier 90, the reset winding 92 of the Not circuit 14, and the non-linear device 94, to the control terminal 96'. Such an action effects a resetting of the magnetic core member 70 to negative saturation. During the same half-cycle of operation, magnetizing current flows from the right end of the secondary winding 30, as shown, through the gating winding 26, the self-saturating rectifier 24, and the non-linear device 22, to the center tap 36 of the transformer 28.

During the next half-cycle of operation when the polarity of the voltage across the secondary winding 30 of the transformer 28 is as shown in the drawing, magnetizing current flows from the left end of the secondary winding 30, as shown, through the gating winding 74, the self-saturating rectifier 76, and the non-linear device 78, to the center tap 36 of the transformer 28. During this same half-cycle of operation, substantially no feed-back current flows to the reset winding 54 of the Not circuit 12 and, thus, it continues to remain at positive saturation.

During the next half-cycle of operation when the voltage across the secondary winding 30 of the transformer 28 is opposite to that shown in the drawing, load current flows from the right end of the secondary winding 30, as shown, through the gating winding 26 of the Not circuit 12, the self-saturating rectifier 24, and the load 48, to the center tap 36 of the transformer 28. Thus, the operating state of the Flip-Flop 10 is changed so that a load voltage appears across the load 48 and not across the load 86. Since a feed-back current now flows to the reset winding 92 of the Not circuit 14, the switch 88 can be actuated to the circuit open position and the Flip-Flop 10 will remain in the same state of operation.

If both the switches 50 and 88 are actuated to the circuit closed position and the switch 114 is left in the circuit open position, then both the magnetic core member 18 and the magnetic core member 70 will be reset to negative saturation and no load voltage will appear across either the load 48 or the load 86. However, if all the switches 50, 88 and 114 are actuated to the circuit closed position, then the voltage across the control terminals 96 and 96' blocks the voltage appearing across the control terminals 64 and 64' and thus prevents resetting of the magnetic core member 18. Such being the case, a load voltage would appear across the load 48. However, the magnetic core member 70 would be reset to negative saturation by the action of the control source 98 and there would be substantially no load voltage across the load 86.

Referring to Fig. 2 there is illustrated another embodiment of this invention in which like components of Figs. 1 and 2 have been given the same reference characters. The main distinction between the apparatus shown in Figs. 1 and 2 is that in the apparatus of Fig. 2 the control sources 116 and 118 effect voltages which oppose the feed-back voltage to thus prevent reset of the associated magnetic core members 18 and 70, respectively, while in the Flip-Flop 10 shown in Fig. 1 the voltages of the control sources 66 and 98 directly effect a reset of their associated magnetic core members 18 and 70, respectively.

Referring to Fig. 2, a feed-back circuit 120 is so interconnected between the gating winding 74 of a Not circuit 122 and the reset winding 54 of a Not circuit 124 that when the control source 116 is not connected to effect a blocking voltage and the magnetic core member 70 is at positive saturation and load current is flowing through the gating winding 74 a feed-back current flows through the reset winding 54 of the Not circuit 124 to effect a reset of the magnetic core member 18 to negative saturation. The feed-back circuit 120 extends from the junction point of the self-saturating rectifier 76 and the non-linear device 78 through a resistor 126, the reset winding 54 of the Not circuit 124, a blocking rectifier 128, and a non-linear device 130, to the center tap 36 of the transformer 28. The function of the resistor 126 and the blocking rectifier 128 will be described hereinafter.

In operation, the non-linear device 130 functions to offer a high impedance to the flow of feed-back current once the magnetic core member 18 is driven to negative saturation. However, when the magnetic core member 18 is being driven toward negative saturation there is substantially no voltage drop across the non-linear device 130 and thus substantially all of the feed-back voltage is available to effect a resetting of the magnetic core member 18 to negative saturation. In other words, the non-linear device 130 has a voltage-current characteristic curve similar to the voltage-current characteristic curve of the non-linear device 22 and comprises a parallel circuit, one branch of which includes a resistor 132 and a direct-current source, specifically a battery 134, and the other branch of which includes a unilateral conducting member, specifically a rectifier 136.

In like manner, a feed-back circuit 138 is interconnected between the gating winding 26 of the Not circuit 124 and the reset winding 92 of the Not circuit 122 so that when switches 140 and 142 are in the circuit open position and when the magnetic core member 18 is at positive saturation and load current is flowing through the gating winding 26, a feed-back current flows through the reset winding 92 of the Not circuit 122 to drive the magnetic core member 70 to the negative saturation. The feed-back circuit 138 extends from the junction point of the self-saturating rectifier 24 and the non-linear device 22 through a resistor 144, the reset winding 92 of Not circuit 122, a blocking rectifier 146, and a non-linear device 148, to the lower end of the non-linear device 22, as shown. The function of the resistor 144 and the blocking rectifier 146 will be described hereinafter.

The non-linear device 148 is similar to the non-linear device 22 and comprises a parallel circuit, one branch of which includes a resistor 150 and a direct-current source, specifically a battery 152, and the other branch of which includes a unilateral conducting member, specifically a rectifier 154. The function of the non-linear device 148 is to offer a high impedance to the flow of feed-back current when the magnetic core member 70 has been driven to negative saturation. However, when the magnetic core member 70 is being reset to negative saturation by the action of the feed-back current flowing through the reset winding 92, there is substantially no voltage drop across the non-linear device 148.

The control circuit for providing a voltage that opposes the feed-back voltage at the output side of the Not circuit 122 includes a blocking rectifier 156, the switch 140, and input control terminals 158 and 158' which are connected to the control source 116. In practice, the magnitude of the control voltage appearing across the control terminals 158 and 158' must be greater than the magnitude of the feed-back voltage appearing at the output side of the Not circuit 122. In fact, the function of the resistor 126 is to attenuate the feed-back voltage appearing at the output side of the Not circuit 122 so that the control voltage appearing between the terminals 158 and 158' is always of greater magnitude than the feed-back voltage appearing at the output side of the Not circuit 122.

The function of the blocking rectifier 128 is to prevent control current from flowing from the control source 116 through the reset winding 54 of the Not circuit 124. On the other hand, the function of the blocking rectifier 156 is to prevent the flow of feed-back current from the output side of the Not circuit 122 through the control source 116.

The control circuit which provides a control voltage which opposes the feed-back voltage at the output side of the Not circuit 124 to thus prevent the reset of the magnetic core member 70 to negative saturation includes a blocking rectifier 160, the switch 142, and input control terminals 162 and 162' which are connected to the control source 118. In practice the magnitude of the control voltage appearing between the terminals 162 and 162' is of greater magnitude than the feed-back voltage appearing at the output side of the Not circuit 124. The function of the resistor 144 is to attenuate the feed-back voltage appearing at the output side of the Not circuit 124 so that it is always of lesser magnitude than the control voltage appearing between the control terminals 162 and 162'.

The function of the blocking rectifier 146 is to prevent the flow of control current from the control source 118 through the reset winding 92 of the Not circuit 122. On the other hand, the function of the blocking rectifier 160 is to prevent the flow of feedback current through the control source 118.

The operation of the apparatus shown in Fig. 2 will now be described. Assuming the switches 140 and 142 are in the circuit open position, then the Flip-Flop circuit shown in Fig. 2 functions similar to the Flip-Flop circuit 10 shown in Fig. 1 except that the feed-back current flows through different components than it does in the Flip-Flop 10 shown in Fig. 1.

In operation, the voltages produced across the control terminals 158 and 158' and across the control terminals 162 and 162' are of a polarity as shown in Fig. 2. The voltage between the control terminals 158 and 158' is so phased with respect to the voltage between the control terminals 162 and 162' that when load current is flowing through the gating winding 74 of the Not circuit 122 and a feed-back voltage appears across the output of the Not circuit 122, specifically across the load 86, a pulse voltage appears between the control terminals 158 and 158' and no voltage appears between the control terminals 162 and 162'. On the other hand, when a load current is flowing through the gating winding 26 of the Not circuit 124 and a feed-back voltage appears across the output of the Not circuit 124, specifically across the load 48, a pulse voltage appears between the control terminals 162 and 162' and no voltage appears between the control terminals 158 and 158'.

Assuming the magnetic core member 70 of the Not circuit 122 is at positive saturation when load current begins to flow from the left end of the secondary winding 30, as shown, through the gating winding 74, then if the switch 140 is closed, the voltage between the control terminals 158 and 158' opposes the feed-back voltage appearing across the load 186. This action prevents the magnetic core member 18 of the Not circuit 124 from being reset to negative saturation. Then during the next half-cycle of operation when the voltage across the secondary winding 30 of the transformer 28 is of a polarity opposite to that shown in the drawing, load current flows from the right end of the secondary winding 30 through the gating winding 26, the self-saturating rectifier 24, and the load 48, to the center tap 46 of the transformer 28. Thus, a load voltage appears across the load 48.

During the same half-cycle of operation when the polarity of the voltage across the secondary winding 30 is opposite to that shown in the drawing, feed-back current flows from the junction point of the self-saturating rectifier 24 and the non-linear device 22 through the resistor 144, the reset winding 92 of the Not circuit 122, the blocking rectifier 146, and the non-linear device 148, to the lower end of the non-linear device 22, as shown. Such an action effects a resetting of the magnetic core member 70 to negative saturation. Then during the next half-cycle of operation, the voltage across the left end of the secondary winding 30 is absorbed by the magnetic core member 70 in driving it to positive saturation and substantially no load voltage appears across the load 86. Thus, the operating state of the Flip-Flop shown in Fig. 2 is changed from that of having a load voltage across the load 86 and no voltage across the load 48 to a load voltage across the load 48 and no voltage across the load 86. Further, the switch 140 can be actuated to the circuit open position and the Flip-Flop circuit shown in Fig. 2 will remain in the same operating state.

Assuming the switch 142 is actuated to the circuit closed position with the switch 140 in the open position and assuming further that the voltage across the secondary winding 30 of the transformer 28 is of opposite polarity to that shown in the drawing and load current is flowing through the gating winding 26 of the Not circuit 124 and through the load 48 so that a load voltage appears thereacross, then with the switch 142 in the circuit closed position, the voltage between the control terminals 162 and 162' opposes the feed-back voltage appearing across the load 48 and thus prevents a reset of the magnetic core member 70 of the Not circuit 122 to negative saturation. Such being the case, during the next half-cycle of operation when the polarity of the voltage across the winding 30 is as shown in the drawing, load current flows from the left end of the secondary winding 30 through the gating winding 74, the self-saturating rectifier 76, and the load 86, to the center tap 36 of the transformer 28, to thus produce a load voltage across the load 86. During this same half-cycle of operation, feed-back current flows through the reset winding 54 of the Not circuit 124 to reset the magnetic core member 18 of the Not circuit 124 to negative saturation. During the next half-cycle of operation, only magnetizing current flows through the gating winding 26 of the Not circuit 124 to drive the magnetic core member 18 to saturation and substantially no load voltage appears across the load 48. Thus, again the operating state of the Flip-Flop circuit shown in Fig. 2 is changed. Further, the switch 142 can be actuated to the circuit open position and the Flip-Flop circuit shown in Fig. 2 will remain in the same operating state.

In some applications in which economy is of prime importance and in which certain operating conditions are not needed, certain of the components shown in Figs. 1 and 2 can be omitted. For instance, in Figs. 1 and 2 the non-linear devices 22 and 78 can be omitted. The non-linear devices 56 and 94 of Fig. 1 and the non-linear devices 130 and 148 of Fig. 2 could also be omitted. Further, the blocking rectifiers 52, 90, 108 and 112 of Fig. 1 and the blocking rectifiers 156 and 160 of Fig. 2 could be omitted. It is also to be understood that the input control circuits such as the circuits 20 and 72 are only illustrative and other types of control means could be substituted therefor.

The apparatus embodying the teachings of this invention has several advantages. For instance, it has a stable operation, that is, it does not assume a new operating state unless a control signal is applied thereto. In addition, the rectifiers and magnetic core members which make up the Flip-Flop circuits can have wide manufacturing tolerances. Also greater loading can be placed on the Flip-Flop circuits without changing their state of operation. Further, the Flip-Flop circuits shown in Figs. 1 and 2 comprise static components and thus require a minimum of maintenance. The Flip-Flop circuits constructed in accordance with this invention require a minimum of component parts.

Since certain changes may be made in the above-described apparatus and circuits, and different embodiments of the invention can be made without departing from the spirit and scope thereof, it is intended that all matter contained in the above description or shown in the accompanying drawing shall be interpreted as illustrative and not in a limiting sense.

We claim as our invention:

1. In a magnetic device, the combination comprising, magnetic core means, said core means being made of material having substantially rectangular loop hysteresis characteristics, a first and a second load winding disposed in inductive relationship with the magnetic core means, a first and a second reset winding disposed in inductive relationship with the magnetic core means, power supply means, circuit means for interconnecting the first and the second load winding in circuit relationship with said power supply means, a feed-back circuit comprising a first serially connected non-linear impedance means interconnected between the first load winding and the second reset winding to effect a reset of that portion of the magnetic core means associated with the second reset winding, another feed-back circuit comprising a second serially connected non-linear impedance means interconnected between the second load winding and the first reset winding to effect a reset of that portion of the magnetic core means associated with the first reset winding, and control means for effecting a change in the flux level in at least one of said portions of the magnetic core means to thus change the operating condition of said magnetic device.

2. In a magnetic device adapted for response to two control signals, the combination comprising, a first and a second magnetic core member, said core members being made of material having substantially rectangular lop hysteresis characteristics, a load winding and a reset winding disposed in inductive relationship with the first magnetic core member, a load winding and reset winding disposed in inductive relationship with the second magnetic core member, power supply means, circuit means for interconnecting said load windings in circuit relationship with said power supply means, a feed-back circuit comprising a first serially connected non-linear impedance means interconnected between the load winding on the first magnetic core member and the reset winding on the second magnetic core member to effect a reset of the second magnetic core member, another feed-back circuit comprising a second serially connected non-linear impedance means interconnected between the load winding on the second magnetic core member and the reset winding on the first magnetic core member to effect a reset of the first magnetic core member, a control circuit adapted to respond to one of said two control signals and connected to the reset winding on the first magnetic core member so as to effect a reset of the first magnetic core member, and another control circuit adapted to respond to the other of said two control signals and connected to the reset winding on the second magnetic core member so as to effect a reset of the second magnetic core member.

3. In a magnetic device adapted for response to two control signals, the combination comprising, a first and a second magnetic core member, said core members being made of material having substantially rectangular loop hysteresis characteristics, a load winding and a reset winding disposed in inductive relationship with the first magnetic core member, a load winding and reset winding disposed in inductive relationship with the second magnetic core member, power supply means, circuit means for interconnecting said load windings in circuit relationship with said power supply means, a feed-back circuit comprising a first serially connected non-linear impedance means interconnected between the load winding on the first magnetic core member and the reset winding on the second magnetic core member to effect a reset of the second magnetic core member, another feed-back circuit comprising a second serially connected non-linear impedance means interconnected between the load winding on the second magnetic core member and the reset winding on the first magnetic core member to effect a reset of the first magnetic core member, a control circuit adapted to respond to one of said two control signals and so connected to the reset winding on the first magnetic core member that said one of said two control signals opposes the voltage effecting a feed-back to the reset winding on the first magnetic core member and thus prevents reset of the first magnetic core member, and another control circuit adapted to respond to the other of said two control signals and so connected to the reset winding on the second magnetic core member that said other of said two control signals opposes the voltage effecting a feed-back to the reset winding on the second magnetic core member and thus prevents reset of the second magnetic core member.

4. In a magnetic device adapted for response to two control signals, the combination comprising, a first and a second magnetic core member, said core members being made of material having substantially rectangular loop hysteresis characteristics a load winding and a reset winding disposed in inductive relationship with the first magnetic core member, a load winding and a reset winding disposed in inductive relationship with the second magnetic core member, power supply means, circuit means for interconnecting said load windings in circuit relationship with said power supply means, a feed-back circuit, including a first serially connected non-linear impedance member, interconnected between the load winding on the first magnetic core member and the reset winding on the second magnetic core member to effect a reset of the second magnetic core member, another feed-back circuit, including another serially connected non-linear impedance member, interconnected between the load winding on the second magnetic core member and the reset winding on the first magnetic core member to effect a reset of the first magnetic core member, a control circuit adapted to respond to one of said two control signals and so connected to the reset winding on the first magnetic core member that said one of said two control signals opposes the voltage effecting a feed-back to the reset winding on the first magnetic core member and thus prevents reset of the first magnetic core member, and another control circuit adapted to respond to the other of said two control signals and so connected to the reset winding on the second magnetic core member that said other of said two control signals opposes the voltage effecting a feedback to the reset winding on the second magnetic core member and thus prevents reset of the second magnetic core member.

5. In a magnetic device adapted for response to two control signals, the combination comprising, a first and a second magnetic core member, said core members being made of material having substantially rectangular loop hysteresis characteristics a load winding and a reset winding disposed in inductive relationship with the first magnetic core member, a load winding and reset winding disposed in inductive relationship with the second magnetic core member, power supply means, circuit means for interconnecting said load windings in circuit relationship with said power supply means, a first feed-back circuit comprising a first serially connected non-linear impedance means interconnected between the load winding on the first magnetic core member and the reset winding on the second magnetic core member to effect a reset of the second magnetic core member, another feed-back circuit comprising a second serially connected non-linear impedance means interconnected between the load winding on the second magnetic core member and the reset winding on the first magnetic core member to effect a reset of the first magnetic core member, and a control circuit adapted to respond simultaneously to both of said two control signals and connected to the reset winding on the first magnetic core member and to the reset winding on the second magnetic core member so as to simultaneously effect a reset of the second magnetic core member and prevent reset of the first magnetic core member.

References Cited in the file of this patent

UNITED STATES PATENTS 2,747,109 Montner -------------- May 22, 1956